(12) United States Patent
Hemingway

(10) Patent No.: US 6,697,520 B1
(45) Date of Patent: Feb. 24, 2004

(54) METHOD OF COLOR INTERPOLATION

(75) Inventor: Peter Hemingway, Bristol (GB)

(73) Assignee: Hewlett-Packard Development Company, L.C., Houston, TX (US)

( * ) Notice: Subject to any disclaimer, the term of this patent is extended or adjusted under 35 U.S.C. 154(b) by 0 days.

(21) Appl. No.: 09/527,860

(22) Filed: Mar. 17, 2000

(30) Foreign Application Priority Data

Mar. 19, 1999 (EP) .............................................. 99302139

(51) Int. Cl.$^7$ .............................. G06K 9/36; H04N 1/46
(52) U.S. Cl. ........................................ 382/166; 358/525
(58) Field of Search ................................ 382/293, 162, 382/166, 167, 300, 276; 358/525, 1.9, 518

(56) References Cited

U.S. PATENT DOCUMENTS

| | | | | |
|---|---|---|---|---|
| 3,893,166 A | | 7/1975 | Pugsley ....................... | 358/523 |
| 4,275,413 A | * | 6/1981 | Sakamoto et al. .......... | 358/525 |
| 5,504,821 A | | 4/1996 | Kanamori et al. .......... | 382/167 |
| 6,289,138 B1 | * | 9/2001 | Yip et al. .................... | 382/307 |
| 6,466,333 B1 | * | 10/2002 | Schoolcraft et al. ......... | 358/1.9 |

FOREIGN PATENT DOCUMENTS

| | | | | |
|---|---|---|---|---|
| EP | 0 647 061 A1 | 4/1995 | ............ | H04N/1/60 |
| EP | 0 883 290 A2 | 12/1998 | ............ | H04N/1/60 |
| EP | 0 923 037 A1 | 6/1999 | ............ | G06F/17/17 |
| GB | 2 332 328 A | 6/1999 | ............ | H04N/1/56 |
| GB | 2 332 329 A | 6/1999 | ............ | H04N/1/56 |
| GB | 2 333 921 A | 8/1999 | ............ | H04N/1/56 |

OTHER PUBLICATIONS

Hung, Po–Chieh, "Colorimetric Calibration in Electronic Imaging Devices Using a Look–up–table Model and Interpolations,", *Journal of Electronic Imaging*, 2(1993) Jan., No. 1, Bellingham, WA.

Kanamori, Katsuhiro, et al, "Fast Color Processor with Programmable Interpolation by Small Memory (PRISM)," *Journal of Electornic Imaging*, 2(1993) Jul., No. 3, Bellingham, WA.

Kasson, James M., et al, Performing Color Space Conversions with Three–dimensional Linear Interpolation, *Nournal of Electronic Imaging*, 4(3), 226–250, (Jul. 1995).

* cited by examiner

Primary Examiner—Wenpeng Chen

(57) ABSTRACT

A method of determining a value for a function that is particularly useful for mapping values from one color space to another includes a series of steps, as follows. The method is applicable to n-dimensional spaces, but is particularly described for three dimensions. The first step is to establish a three dimensional lattice, the function having values at the lattice points. The next step is to record values of the function for a subset of the lattice points, the lattice points of the subset known value lattice points. These known value lattice points from a sparse lattice (preferably the sparse lattice points ate regularly spaced along orthogonal axes). A values of the function for a given lattice point is established by returning a weighted average of the values of one or more of four known value lattice points defining a tetrahedron touching or enclosing the given lattice point. Each of the lattice points that are intermediate points in a coarse lattice cube is either within, or on the boundary of, at least one tetrahedron whose vertices are four of the vertices of the cube.

10 Claims, 6 Drawing Sheets

Storage required for mapping three 8-bit inputs to three output bytes

METHOD OF COLOR INTERPOLATION

BACKGROUND OF THE INVENTION

1. Field of Invention

The present invention relates to a method of interpolation between known values to find intermediate values.

2. Description of the Related Art

Interpolation has a number of applications, particularly in the field of image processing. A particularly important use is in color mapping: the taking of values in one color space and mapping them on to corresponding values in another color space. Color mapping is important, because different devices may function best or most naturally in a particular color space. For example, a scanner may advantageously use the additive color space RGB (Red, Green, Blue), whereas a printer may more advantageously use the subtractive color space CMY (Cyan, Magenta, Yellow). There are a large number of other color spaces in common use: CieLab, CMYK, $YC_bC_r$, LUV and LHS are examples. To allow devices using different color spaces to interact, a method is needed to convert data from the color space of one device to the color space of another.

Such conversions can generally be carried out with a mathematical formula (though not a trivial one, as such mappings will typically be non-linear). The most satisfactory approach to computation in such cases is to use a lookup table. The difficulty with using a lookup table is that this may need to be extremely large—for example, a full table for conversion from a 24 bit RGB color space to a 24 bit CMY color space would require 48 MByte of memory, which is clearly unacceptably large. The solution, set out in UK Patent 1369702 and U.S. Pat. No. 3,893,166, is to store in the table only a coarse (sparse) lattice of points in the color space, and to use linear interpolation to compute the values between these points. In this approach, only values for every $2^N$ points are stored in each of the input dimensions (plus the last point in every dimension). Choice of N is important—if low, then the table will be large, and if high, interpolation will not approximate with sufficient accuracy. If N=4, the conversion above is reduced in size to a more acceptable 14.4 KByte.

FIG. 1 illustrates the problem. Input color space components 1 are provided in three dimensions (a, b, c). For the values in each of these dimensions, the higher bits $a_u, b_u, c_u$ (from the highest bit to bit N) are used to find a coarse lattice point 2, and more particularly the cube 3 in the coarse lattice containing the point of interest. The lowest bits $a_l, b_l, c_l$ are then used to determine the output components 4 with values x,y,z in the output color space using interpolation.

A number of interpolation techniques have been developed. The best known is trilinear interpolation, which uses a weighted average of values at the eight vertices of a cube in the sparse lattice to obtain the output. Trilinear interpolation is shown in FIG. 2. Values are known for the coarse lattice points 21. In a first linear interpolation step, a weighted average is taken between one of the sets of points and another of the sets of points (at opposite faces of the cube formed by the coarse lattice points 21). This generates four first linear interpolation points 22 (though alternative choices 23, 24 could also have been made). The second linear interpolation step involves interpolation between these four points to give two second linear interpolation points 25 (using the earlier alternative choices for first linear interpolation points, again alternative second linear interpolation points 26, 27 could be chosen). Whichever route is followed, the third linear interpolation step between the two second linear interpolation points provides the third linear interpolation point 28 and hence the output value.

Trilinear interpolation, and most other known interpolation processes, require eight table accesses (essentially, one access for each vertex). An improvement on this is provided by radial interpolation, described in British Patent Application No. 9826975.6. Radial interpolation has the advantage that it requires only five table accesses, rather than eight. Various other interpolation approaches are known, but none of these provides any significant reduction in computational complexity.

It is desirable to try and still further improve interpolation by reducing further computational complexity, and in particular by reducing as far as possible the total memory consumption for processes such as color mapping.

SUMMARY OF INVENTION

Accordingly, the invention provides a method of determining a value for a function, comprising: establishing an n-dimensional lattice having a plurality of lattice points, the function having values at the lattice points, wherein n is a positive integer greater than or equal to two; recording values for a subset of the lattice points, the lattice points of the subset being known value lattice points; and establishing a value for a given lattice point by determining the values of only m of (n+1) known value lattice points defining an n-simplex touching or enclosing the given lattice point, wherein m is a positive integer equal to the number of n-simplexes of non-zero volume whose vertices consist of the given lattice point and n of the (n+1) known value lattice points, and by returning a weighted average of said m of the known value lattice points.

This approach is highly advantageous, as it ensures that the value for any given lattice point can be found with a maximum of (n+1) look up operations from the table of given value lattice points (the sparse lattice). If these look up operations have a critical effect on the performance of the overall system—which may be the case, particularly where the values for the sparse lattice are packed, to minimize storage requirements - then this minimization of look up operations can have a real effect on speed, in particular.

While this approach is valid for n-dimensional spaces, it is of most interest here for three-dimensional spaces (as would typically be used in color mapping). The approach is particularly effective where n=3, and the known value lattice points define a tetrahedron. Four is now the maximum number of look up operations required.

Whereas four is a maximum number of look up operations required, for many cases preferred embodiments of the invention can reduce this number to three, two, or one. Advantageously, a weighted average of all four known value lattice point values is used if the given lattice point is enclosed by the tetrahedron but is not touched by a face of the tetrahedron, a weighted average of three of the four known value lattice point values is used if the given lattice point is on a face of the tetrahedron bounded by the three of the four known value lattice points but is not touched by an edge of the tetrahedron, a weighted average of two of the four known value lattice point values is used if the given lattice point is on an edge of the tetrahedron bounded by the two of the four known value lattice points but is not at a vertex of the tetrahedron, and wherein a value of one of the known value lattice points is used if the given lattice point is also the known value lattice point.

In particular embodiments, the average number of table look up operations can be reduced further. For example, where a given lattice point is close to a known value lattice point, the given lattice point may be changed to the known value lattice point hence avoiding need for calculation of any weighted average, thus reducing the number of table look up operations required to one (from, typically, four) for such cases.

Advantageously, the known value lattice points form a sparse lattice with known value lattice points separated from each other by an integer multiple (preferably an integer power of two) of the distance between adjacent lattice points. A particularly preferred value for the integer is 8.

In a preferred approach, the step of establishing a value comprises determining a set of four known value lattice points which form a tetrahedron touching or enclosing the given lattice point, and providing the weighted average from the positions of four known value lattice points, the known values of one or more of the four known value lattice points, and the position of the given lattice point. Advantageously, the step of providing the weighted average comprises using the positions as inputs to a jump table, or similar. (Case statements are used in the specific example described below; use of a computed goto is a further alternative).

The method can be carried out by using a programmed computer, or can be facilitated by providing a programmed memory or storage device that can be accessed by a computer.

The method can advantageously be used for mapping values in a first color space to values in a second color space. However, this is far from the only possible application for this technique. Look up tables are frequently used when the result is known, but cannot be computed from a function (either because the computation is too complex to perform in real time, or because the function itself is unknown). For example, a forward function may exist that, given the result as its parameter, will yield the input value, but the function cannot be used to find the result because the inverse function cannot be found. One solution to the lack of an inverse function is simply to enumerate all the parameters for the forward function and tabulate the results. The table can then be used to perform the inverse function, but if the table is too large to store, it can be stored in a sparse manner and intermediate values calculated by interpolation—this interpolation can be carried out by methods in accordance with the invention.

Use of large look up tables, best stored sparsely, (and hence suitable for application of the invention) may arise in a large number of contexts. In automotive control, engine management systems may well require such look up tables. Medical imaging is a further likely area—particularly for image reconstruction in tomography (especially soft field electrical tomography). In computer animation, such an approach is particularly appropriate for recovering the parameters that represent the motion of objects in the animation. In image analysis, this approach is particularly suitable to image enhancement and image recognition. The skilled man will appreciate that this general approach may be applied in many other contexts.

DESCRIPTION OF THE DRAWING FIGURES

A specific embodiment of the invention will now be described, by way of example, with reference to the accompanying drawings, in which.

DETAILED DESCRIPTION

The general principles of an embodiment of the invention for translating values in one space to values in another space are described below for a three dimensional example (the general n-dimensional case is given at the end of this description): a ready application of this is, as indicated above, to color spaces.

Figure 1:
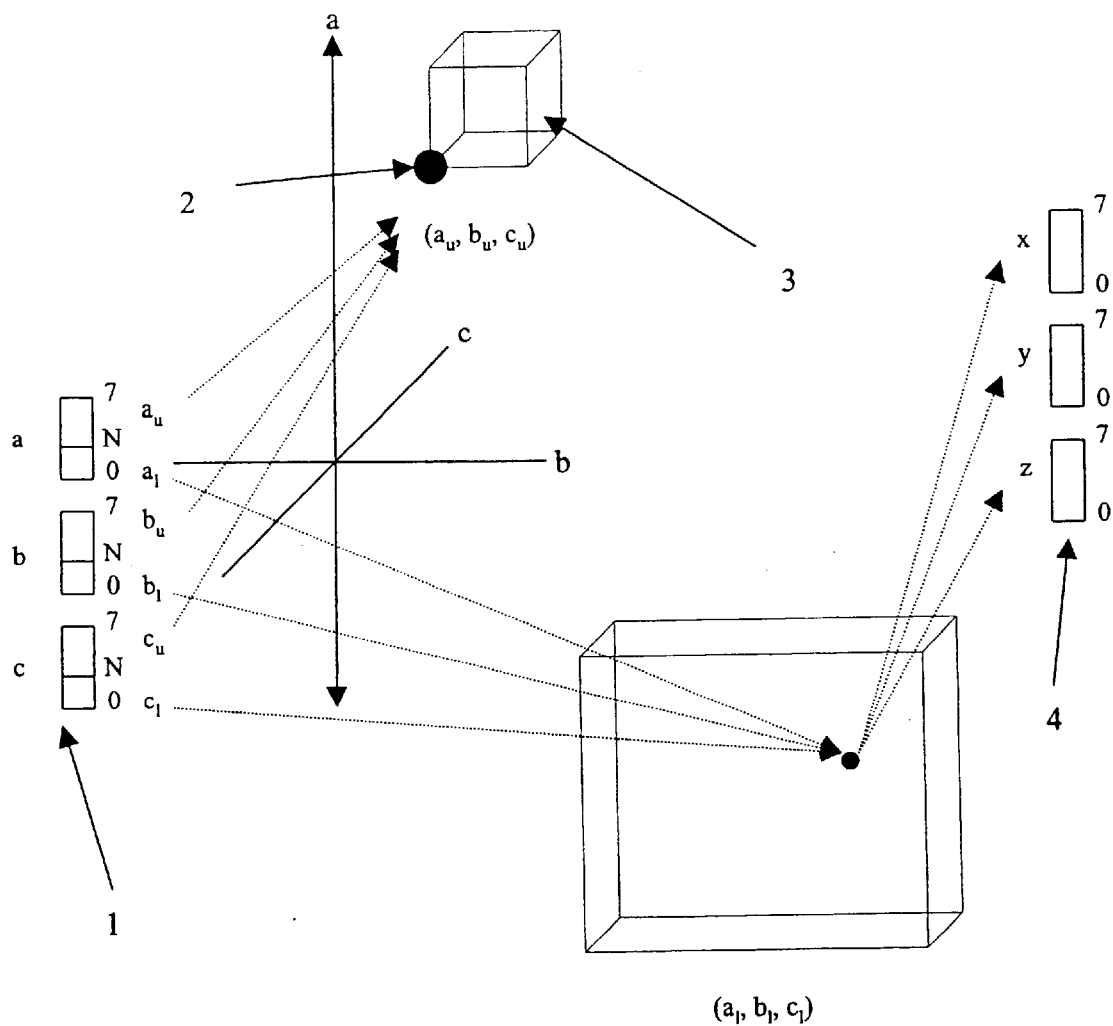
FIG. 1 shows conversion of values in a first color space to values in a second color space, where values in the second color space are stored for a sparse lattice of points.
Figure 2:
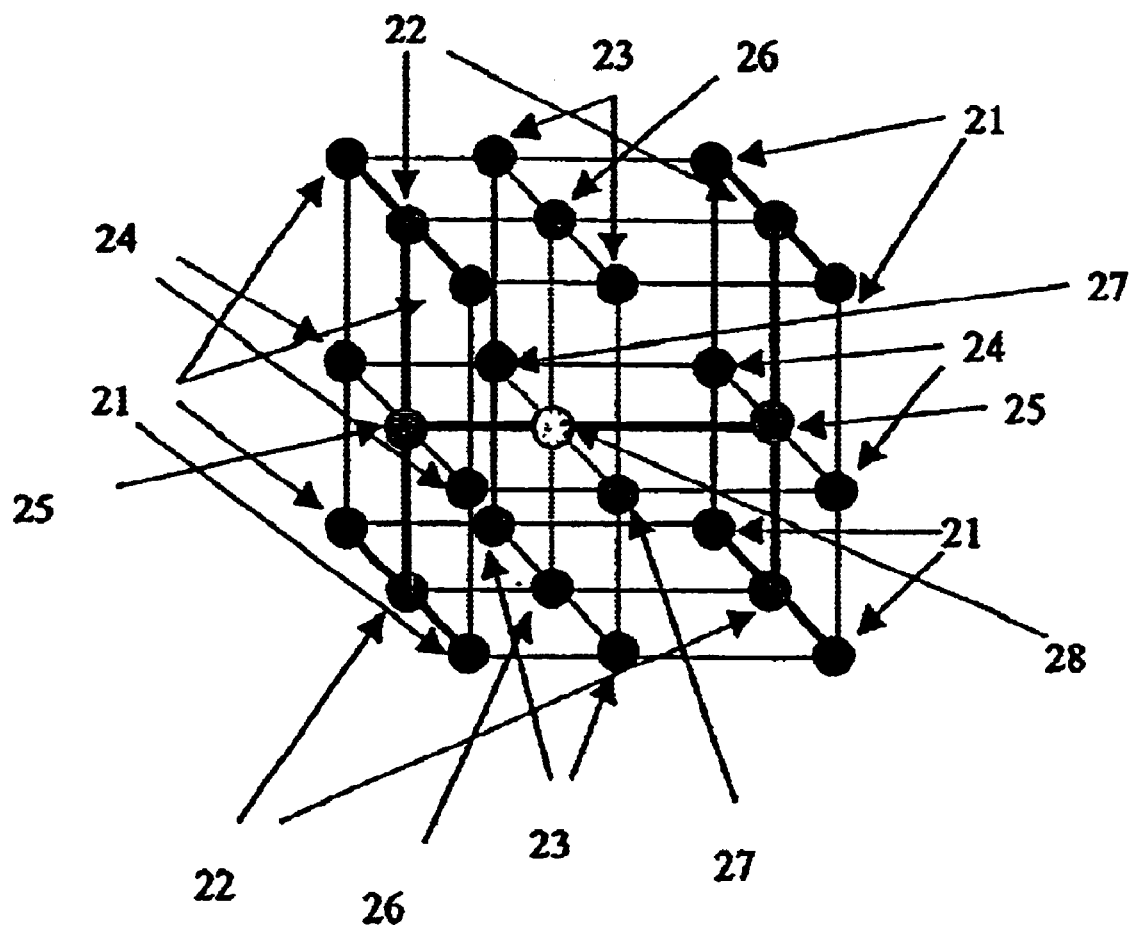
FIG. 2 shows trilinear interpolation for an intermediate point in a sparse lattice.
Figure 3A:
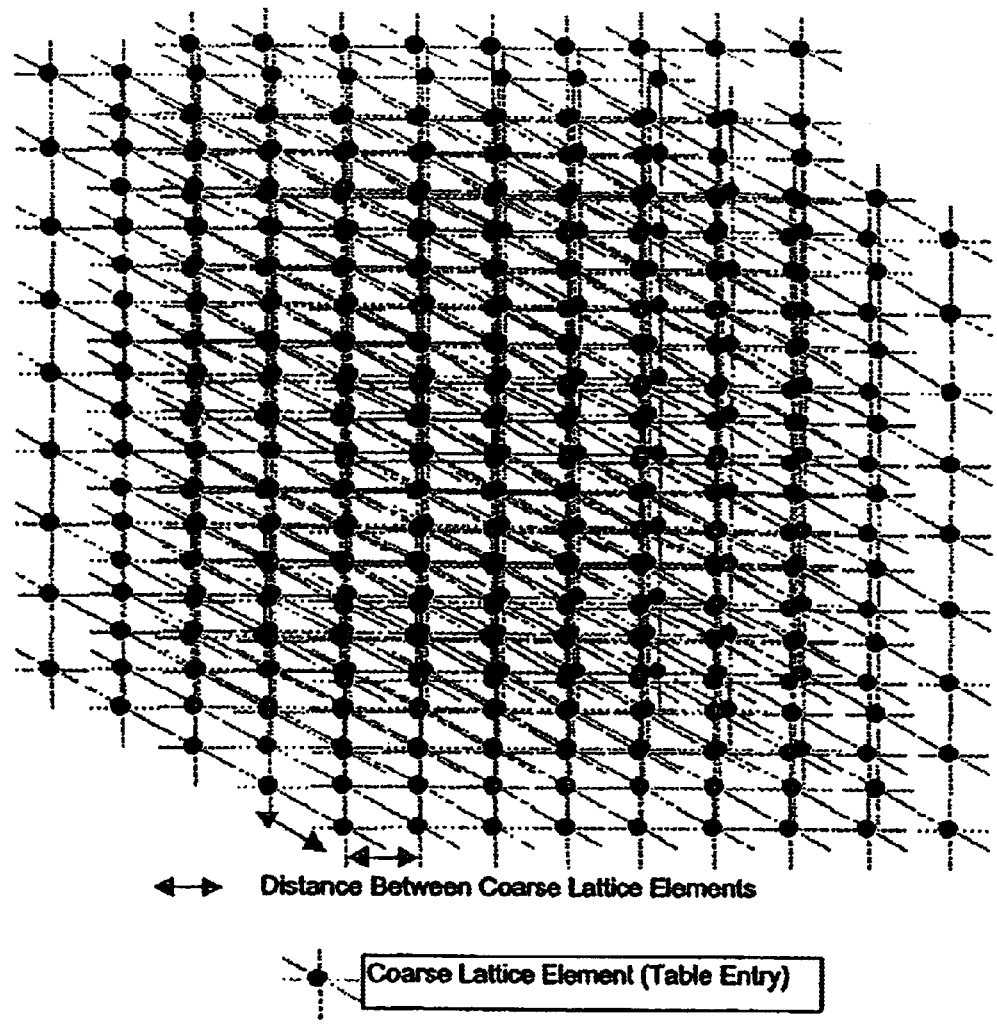
FIG. 3a shows a sparse lattice of points.
Figure 3B:
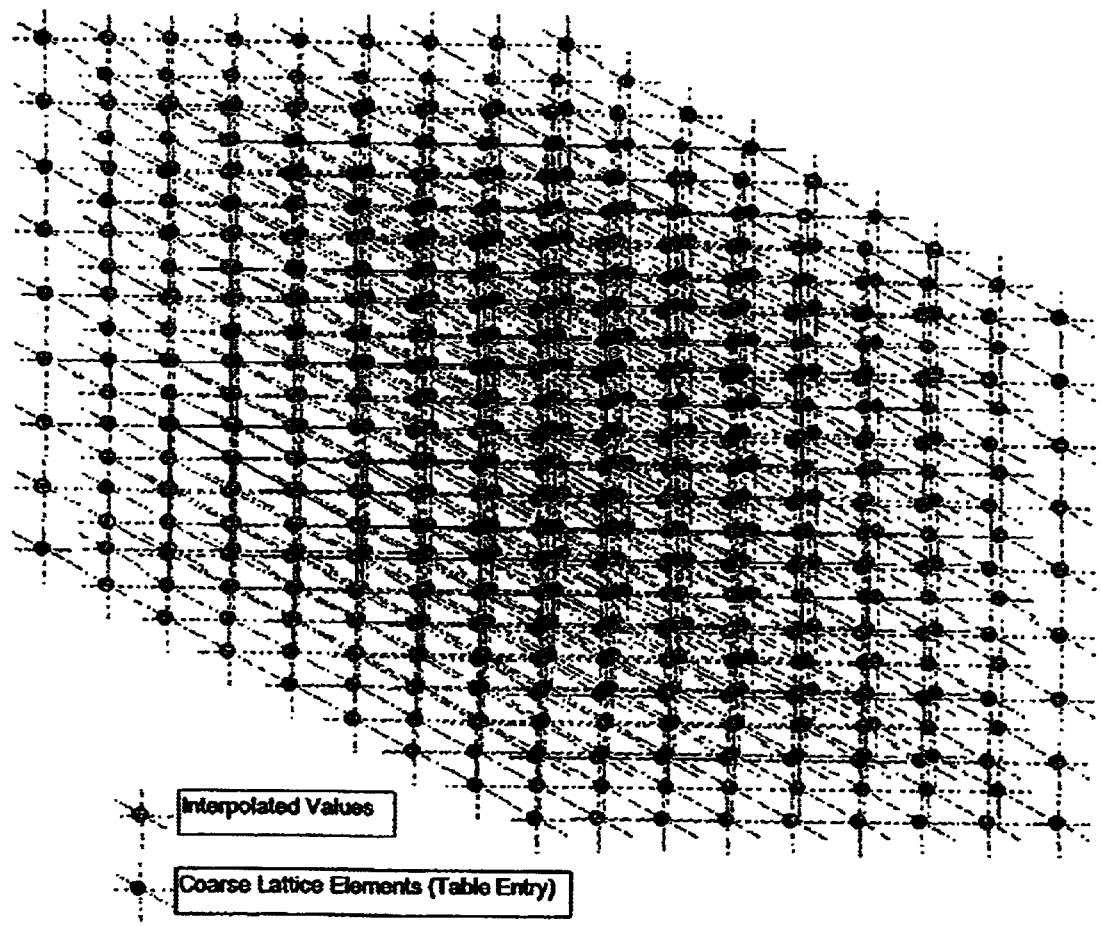
FIG. 3b shows the full set of lattice points in a cube bounded by adjacent sparse lattice points.

FIG. 3a shows a coarse lattice of points for which known values are stored. These points are separated by a number of intermediate points, for which values are not stored, but for which approximate values can be derived by interpolation. For computational convenience, the spacing between coarse lattice points is advantageously $2^N$ times the intermediate point spacing. An elemental cube in the coarse lattice and its associated intermediate points, for n=3, in FIG. 3b: if the intermediate point spacing is considered to be 1, the coarse lattice point spacing is 8, and a total of 512 values can be interpolated for one coarse lattice point.

Figure 4:
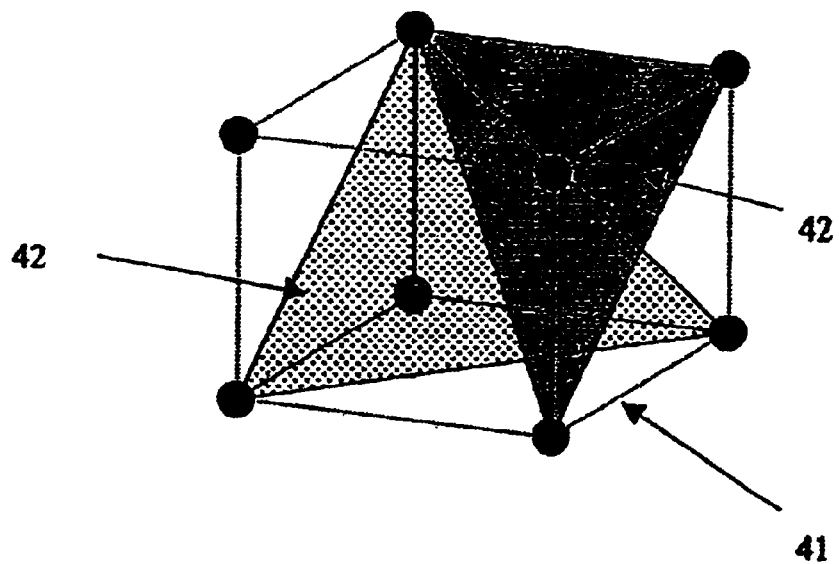
FIG. 4 shows use of tetrahedra with vertices of adjacent sparse lattice points in a method according to an embodiment of the invention.
Figure 5:
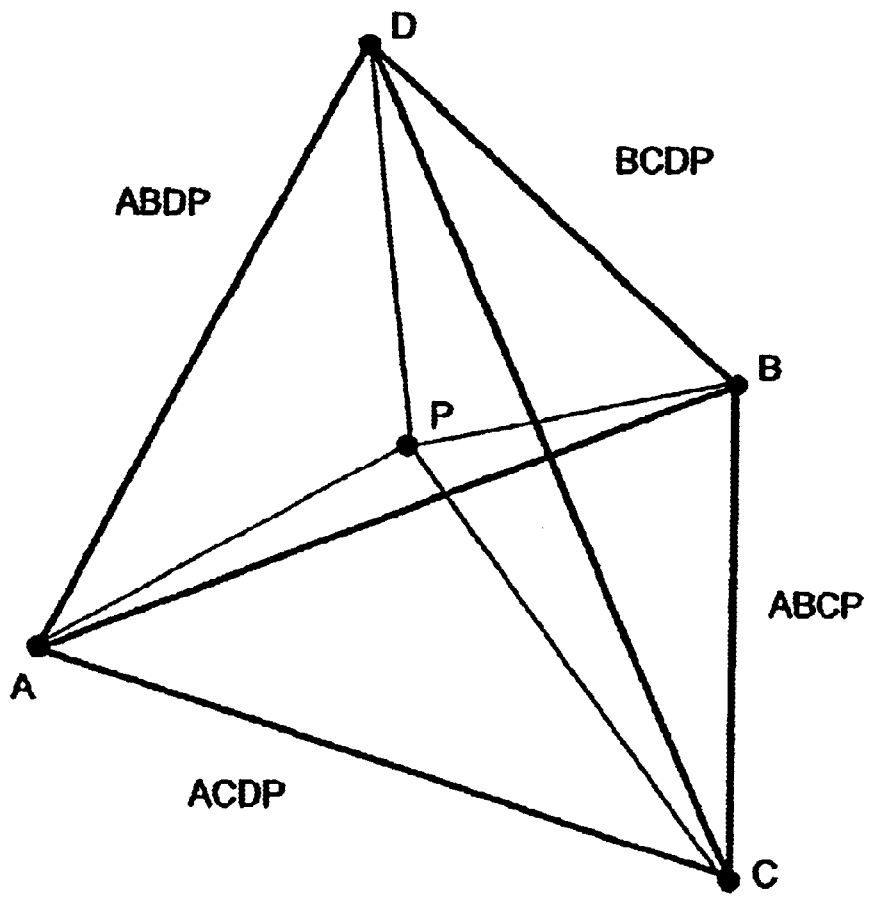
FIG. 5 shows calculation of a value for a lattice point located within a tetrahedron according to an embodiment of the invention.

As can be seen from FIG. 4, each of the intermediate points in a coarse lattice cube 41 is either within, or on the boundary of, at least one tetrahedron 42 whose vertices are four of the vertices of the cube. Considering a tetrahedron with vertices of coarse lattice points ABCD and an intermediate point P as shown in FIG. 5, it is possible to work out whether point P lies inside or outside the tetrahedron ABCD: if $$\text{Vol}(ABCP)+\text{Vol}(ABDP)+\text{Vol}(ACDP)+\text{Vol}(BCDP) > \text{Vol}(ABCD)$$

(where the volume between four positions is expressed as Vol(position 1 position 2 position 3 position 4)), then P lies outside this tetrahedron. If P lies on or within the tetrahedron, then the value p at P can be found from the values a, b, c, d at A, B, C, D by $$p=(\text{Vol}(ABCP).\ d+\text{Vol}(ABDP).\ c+\text{Vol}(ACDP).\ b+\text{Vol}(BCDP).\ a)/\text{Vol}(ABCD)$$

The volume of a tetrahedron with one vertex at the origin can be expressed by the following formula:

$$\text{Vol}=|(x_1(y_2z_3-z_2y_3)-y_1(x_2z_3-z_2x_3)+z_1(x_2y_3-y_2x_3))/6|$$

These equations can be used to determine whether a particular point lies on or inside a tetrahedron, and also the relative influences of each point (the ratio of the tetrahedral volumes). Some points within the coarse lattice cube will have several equivalent interpolation equations. For example, the point in the middle of the cube lies at the midpoint of three diagonal lines. If the space within the coarse lattice cube is linear, then all equations should yield similar results. In practice the results may differ, and the degree of difference is a measure of the distortion within a particular coarse lattice cube. This can be useful in determining whether the lattice is too coarse to achieve an acceptable approximation.

This method is effective in increasing speed and reducing computational complexity, as only four table lookups (one to find the value for each of the four vertices of the relevant tetrahedron) are used. A further advantage of this approach is that for points lying on any of the boundaries of the tetrahedron, even fewer points need to be used.

Figure 6:
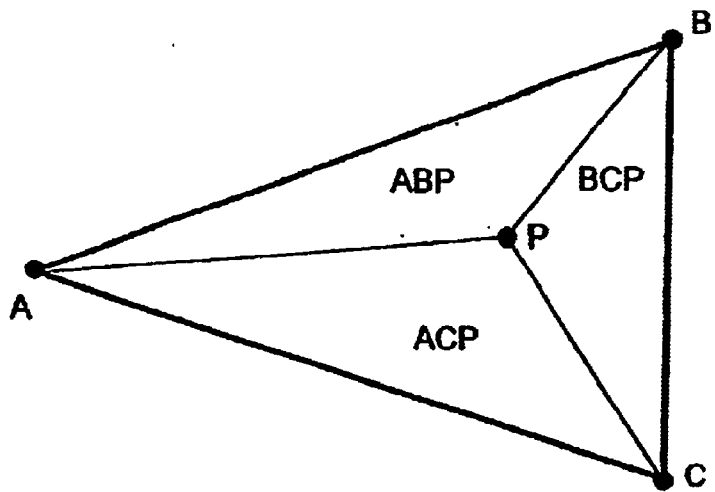
FIG. 6 shows calculation of a value for a lattice point located on a face of a tetrahedron according to an embodiment of the invention.

If a lattice point lies on the face of a tetrahedron, as shown in FIG. 6 (where point P lies on the plane ABC), then the value p can be found from d by weighted average of areas (rather than volumes as for the general case). The expression for the interpolated value p reduces to:

$$p=(\text{Area}(ABP)*c+\text{Area}(ACP)*b+\text{Area}(BCP)*a)/\text{Area}(ABC)$$

where the area of a triangle can be found by, for example, Heron's formula:

$$\text{Area}=(s(s-a)(s-b)(s-c))^{1/2}$$

where $s=(a+b+c)/2$ and a b and c are the lengths of the three sides.

For P to lie on the plane defined by ABC and within the area ABC:

$$\text{Area}(ABP)+\text{Area}(ACP)+\text{Area}(BCP)=\text{Area}(ABC)$$

In the case of an intermediate point lying on the face of a tetrahedron, it is therefore possible to calculate the value of the intermediate point using only three table lookups, with a consequent further increase in speed.

For a point lying on a line between two of the vertices of the tetrahedron, the calculation reduces still further. The expression for the interpolated value p now reduces to:

$$p=(\text{Length}(BP)*a+\text{Length}(AP)*b)/\text{Length}(AB))$$

again, for P to lie on the line AB, then $$\text{Length}(AB)=\text{Length}(AP)+\text{Length}(BP)$$

The distance between two points $(x_1,y_1,z_1)$ and $(x_2,y_2,z_2)$ is equal to $((x_1-x_2)^2+(y_1-y_2)^2+(z_1-z_2)^2)^{1/2}$. For such points, only two table lookups are now required, as a weighted average of lines is all that is required. Clearly, if the "intermediate point" in fact lies at a vertex, the general expression reduces to, for example:

$$p=a$$

as $\text{Vol}(BCDP)=\text{Vol}(ABCD)$, and $\text{Vol}(ABCP)=\text{Vol}(ABDP)=\text{Vol}(ACDP)=\text{Vol}(APCP)=0$. In this case, only one table lookup is required.

Use of this approach provides effective reduction of the number of table accesses required for interpolation, which is particularly important to maximise speed if the coarse lattice point values are stored in a packed array (in which case less storage is required, but retrieval is more difficult). Table 1 illustrates the frequency with which intermediate points fall on vertices, lines or faces of tetrahedra in a coarse lattice cube.

TABLE 1

Location of intermediate points in relation to coarse lattice tetrahedra

| N | Inter Lattice Distance $2^N$ | Sub Cube Volume $(2^N)^3$ | On Point | On Line | Within Triangle | In Tetrahedron |
|---|---|---|---|---|---|---|
| 0 | 1 | 1 | 1 | 0 | 0 | 0 |
| 1 | 2 | 8 | 1 | 7 | 0 | 0 |
| 2 | 4 | 64 | 1 | 33 | 30 | 0 |
| 3 | 8 | 512 | 1 | 85 | 378 | 48 |
| 4 | 16 | 4096 | 1 | 189 | 2322 | 1584 |
| 5 | 32 | 32768 | 1 | 397 | 11202 | 21168 |
| 6 | 64 | 262144 | 1 | 813 | 48918 | 212418 |
| 7 | 128 | 2097152 | 1 | 4579 | 188586 | 1903986 |

The corresponding probabilities of requiring one, two or three table accesses rather than the general (and maximum) number of four is shown in Table 2.

TABLE 2

Probable number of table accesses

| N | P(Point) | P(Line) | P(Triangle) | P(Tetrahedron) | Average Table Access | Best Case | Worst Case |
|---|---|---|---|---|---|---|---|
| 0 | 0.0000000 | | | | 1.0000000 | 1.0000000 | 1.0000000 |
| 1 | 0.1250000 | 0.8750000 | | | 1.8750000 | 1.0000000 | 2.0000000 |
| 2 | 0.0156250 | 0.5156250 | 0.4687500 | | 2.4531250 | 1.0000000 | 3.0000000 |
| 3 | 0.0019531 | 0.1660156 | 0.7382813 | 0.0937500 | 2.9238281 | 1.0000000 | 4.0000000 |
| 4 | 0.0002441 | 0.0461426 | 0.5668945 | 0.3867188 | 3.3400879 | 1.0000000 | 4.0000000 |
| 5 | 0.0000305 | 0.0121155 | 0.3418579 | 0.6459961 | 3.6338196 | 1.0000000 | 4.0000000 |
| 6 | 0.0000038 | 0.0031013 | 0.1866074 | 0.8103104 | 3.8072701 | 1.0000000 | 4.0000000 |
| 7 | 0.0000005 | 0.0021834 | 0.0899248 | 0.9078913 | 3.9057069 | 1.0000000 | 4.0000000 |

For small N, on average significantly fewer than four table accesses are required. For greater efficiency, points close to a lattice point could be snapped to a lattice point, rather than treated as general intermediate points. This is described further below.

For each possible point P it is possible to derive the weights and coarse lattice points to be used. For N=2 there are 64 points in the subcube, which can be addressed as P[x][y][z], where x, y and z are between 0 and 3 inclusive (points P which would have a value of x, y or z=4, although these would in fact be touched by the coarse lattice cube under consideration, are in fact treated in adjoining coarse lattice cubes in which the points would have a corresponding x, y or z value of 0). It is convenient to write a program to generate the equation coefficients for evaluation of p in each case, but the efficiency of generating the equations is not important: it is the efficiency of execution of the equations, once generated, that is important for the efficiency of the interpolation process. If the eight vertices of the cube (which are coarse lattice points) are referred to as W, X, Y, Z, XY, XZ, YZ, XYZ, then the interpolations can be given by the equations shown in Table 3 for the N=2 case.

TABLE 3

Interpolation Equations for N = 2

P[0][0][0] = (4W + 2)/4
P[0][0][1] = (3W + 1Z + 2)/4
P[0][0][2] = (2W + 2Z + 2)/4
P[0][0][3] = (1W + 3Z + 2)/4
P[0][1][0] = (3W + 1Y + 2)/4
P[0][1][1] = (3W + 1YZ + 2)/4
P[0][1][2] = (2W + 1Z + 1YZ + 2)/4
P[0][1][3] = (1Y + 3Z + 2)/4
P[0][2][0] = (2W + 2Y + 2)/4
P[0][2][1] = (2W + 1Y + 1YZ + 2)/4
P[0][2][2] = (2Y + 2Z + 2)/4
P[0][2][3] = (1Y + 2Z + 1YZ + 2)/4
P[0][3][0] = (1W + 3Y + 2)/4
P[0][3][1] = (3Y + 1Z + 2)/4
P[0][3][2] = (2Y + 1Z + 1YZ + 2)/4
P[0][3][3] = (1W + 3YZ + 2)/4
P[1][0][0] = (3W + 1X + 2)/4
P[1][0][1] = (3W + 1XZ + 2)/4
P[1][0][2] = (2W + 1Z + 1XZ + 2)/4
P[1][0][3] = (1X + 3Z + 2)/4
P[1][1][0] = (3W + 1XY + 2)/4
P[1][1][1] = (3W + 1XYZ + 2)/4
P[1][1][2] = (1X + 1Y + 2Z + 2)/4
P[1][1][3] = (1X + 3Z + 2)/4
P[1][2][0] = (2W + 1Y + 1XY + 2)/4
P[1][2][1] = (1X + 2Y + 1Z + 2)/4
P[1][2][2] = (2Y + 1Z + 1XZ + 2)/4
P[1][2][3] = (1XY + 2Z + 1YZ + 2)/4
P[1][3][0] = (1X + 3Y + 2)/4
P[1][3][1] = (3Y + 1XZ + 2)/4
P[1][3][2] = (2Y + 1XZ + 1YZ + 2)/4
P[1][3][3] = (1X + 3YZ + 2)/4
P[2][0][0] = (2W + 2X + 2)/4
P[2][0][1] = (2W + 1X + 1XZ + 2)/4
P[2][0][2] = (2X + 2Z + 2)/4
P[2][0][3] = (1X + 2Z + 1XZ + 2)/4
P[2][1][0] = (2W + 1X + 1XY + 2)/4
P[2][1][1] = (2X + 1Y + 1Z + 2)/4
P[2][1][2] = (2X + 1Z + 1YZ + 2)/4
P[2][1][3] = (1XY + 2Z + 1XZ + 2)/4
P[2][2][0] = (2X + 2Y + 2)/4
P[2][2][1] = (2X + 1Y + 1YZ + 2)/4
P[2][2][2] = (2XY + 2Z + 2)/4
P[2][2][3] = (1XY + 2Z + 1XYZ + 2)/4
P[2][3][0] = (1X + 2Y + 1XY + 2)/4
P[2][3][1] = (2Y + 1XY + 1XZ + 2)/4
P[2][3][2] = (2XY + 1Z + 1YZ + 2)/4
P[2][3][3] = (1XY + 1XZ + 2YZ + 2)/4
P[3][0][0] = (1W + 3X + 2)/4
P[3][0][1] = (3X + 1Z + 2)/4
P[3][0][2] = (2X + 1Z + 1XZ + 2)/4
P[3][0][3] = (1W + 3XZ + 2)/4
P[3][1][0] = (3X + 1Y + 2)/4
P[3][1][1] = (3X + 1YZ + 2)/4
P[3][1][2] = (2X + 1XZ + 1YZ + 2)/4
P[3][1][3] = (1Y + 3XZ + 2)/4
P[3][2][0] = (2X + 1Y + 1XY + 2)/4
P[3][2][1] = (2X + 1XY + 1YZ + 2)/4
P[3][2][2] = (2XY + 1Z + 1XZ + 2)/4
P[3][2][3] = (1XY + 2XZ + 1YZ + 2)/4
P[3][3][0] = (1W + 3XY + 2)/4
P[3][3][1] = (3XY + 1Z + 2)/4
P[3][3][2] = (2XY + 1XZ + 1YZ + 2)/4
P[3][3][3] = (1W + 3XYZ + 2)/4

For many of these intermediate points, more than one equation exists. For example, P[2][2][2] lies in the centre of the 8 vertices, and so also lies on the midpoint of four diagonals. Any of the following four equations could be employed:

P[2][2][2] = (2XY + 2Z + 2)/4
= (2X + 2YZ + 2)/4
= (2XYZ + 2W + 2)/4
= (2Y + 2XZ + 2)/4

These four equations are all equivalent as they all access only two elements, and the overall weighting is the same for each equation. However, each equation may yield a different result if the volume bounded by W, X, Y, Z, XY, XZ, YZ, XYZ is not linear: the greater the non-linearity, the greater the difference between the results. In some cases, it may be preferable to use one of such alternative equations over another: for example, for color tables it is typically better to average along the neutral axis.

An efficient method of implementing this form of interpolation in software is by use of a case statement. This involves listing the appropriate equation for each case, together with a mechanism to allow a jump to the relevant case. Cases start from zero and are consecutive—the overhead of a case statement is typically about six instructions.

Specifically, the high order bits of the input are used to provide a table offset (essentially, to determine which coarse lattice cube to use), and the lower order bits to choose which case to execute. Each case corresponds to an intermediate point, and need only access the values for the specific coarse lattice points required by the relevant case equation. Each case statement can be generated in advance by a program using the tetrahedral volume ratios indicated earlier. The interpolation coefficients for the lattice points are known integers in the range $(1 \ldots, (2^N-1))$, with the sum of the coefficients being equal to $2^N$. The final step (which can be performed outside the case statement) is to round (by adding $(2^N)/2$) and normalise (by dividing by $2^N$). For example, mapping three input bytes to one output byte the table size will be $(2^{8-N}+1)^3$, and there will be $(2^N)^3$ cases.

Generation of case statements in advance makes it relatively easy for the number of table accesses to be reduced further by "snapping" a lattice point on to a nearby known value lattice point. All points within some predetermined degree of proximity to a known value lattice point (for example, all lattice points adjacent to the known value lattice points) can be determined and case statements for these points provided which simply return the value at the known value lattice point. Table accesses can be reduced still further, albeit with more complex calculation required in establishing the case statements (though with no added complexity in the interpolation itself), by snapping lattice points not only to known value lattice points, but also to lines and surfaces, where the lattice point is near an edge or a face of the tetrahedron. Again, this involves at the time of constructing the case statements determining which points lie within a proximity threshold, and providing a case statement returning the function of two or three known value lattice points appropriate to the equivalent point on the line or surface respectively. Use of this "snapping" approach does reduce the accuracy of interpolation for "snapped" points, but also very significantly decreases the average number of look up operations required.

An example of code for N=4, providing a representative collection of case statements (the remainder of the case statements can be calculated according to principles illustrated above without difficulty, but are omitted here for reasons of space) is provided below.

EXAMPLE

Code for N = 4

```
#define N 4
#define SIZE 16
#define STRIDE ((1<<(8-N))+1)
#define ROUND 8
unsigned char table[(STRIDE)*(STRIDE)*(STRIDE)];
#define W      offset[0]                             /* x = 0, y = 0, z = 0 */
#define X      offset[STRIDE*STRIDE]                 /* x = 1, y = 0, z = 0 */
#define XY     offset[STRIDE*STRIDE + STRIDE]        /* x = 1, y = 1, z = 0 */
#define XYZ    offset[STRIDE*STRIDE + STRIDE+1]      /* x = 1, y = 1, z = 1 */
#define XZ     offset[STRIDE*STRIDE + 1]             /* x = 1, y = 0, z = 1 */
#define Y      offset[STRIDE]                        /* x = 0, y = 1, z = 0 */
#define YZ     offset[STRIDE + 1]                    /* x = 0, y = 1, z = 1 */
#define Z      offset[1]                             /* x = 0, y = 0, z = 1 */
char interpolate(xin, yin, zin) int xin, yin, zin; {char p;
  int swvar = (((xin&(SIZE-1)) << (2*N))| ((yin&(SIZE-1)) << N) | (zin&(SIZE-1)));
  register char *offset = &table[ ((xin>>N)*STRIDE*STRIDE)) +((yin>>N)*STRIDE) + (zin>>N)];
  switch( swvar) {
    case 0 : p = 16*W; break;
    case 1 : p = 15*W + Z; break;
    case 2 : p = 14*W + 2*Z; break;
    case 3 : p = 13*W + 3*Z; break;
    ...
    case 4074 : p = 6*XY + 2*XZ + YZ + 7*XYZ; break;
    case 4075 : p = 5*XY + 2*XZ + YZ + 8*XYZ; break;
    case 4076 : p = 4*XY + 2*XZ + YZ + 9*XYZ; break;
    case 4077 : p = 2*X + Y + 13*XYZ; break;
    case 4078 : p = 2*X + YZ + 13*XYZ; break;
    case 4079 : p = Y + 2*XZ + 13*XYZ; break;
    case 4080 : p = W + 15*XY;; break;
    case 4081 : p = 15*XY + Z;; break;
    case 4082 : p = 14*XY + XZ + YZ; break;
    case 4083 : p = 13*XY + Z + 2*XYZ; break;
    case 4084 : p = 12*XY + Z + 3*XYZ; break;
    case 4085 : p = 11*XY + Z + 4*XYZ; break;
    case 4086 : p = 10*XY + Z + 5*XYZ; break;
    case 4087 : p = 9*XY + Z + 6*XYZ; break;
    case 4088 : p = 8*XY + Z + 7*XYZ; break;
    case 4089 : p = 7*XY + Z - 8*XYZ; break;
    case 4090 : p = 6*XY + Z + 9*XYZ; break;
    case 4091 : p = 5*XY + Z + 10*XYZ; break;
    case 4092 : p = 4*XY + Z + 11*XYZ; break;
    case 4093 : p = 3*XY + Z + 12*XYZ; break;
    case 4094 : p = 2*XY + Z + 13*XYZ; break;
    case 4095 : p = + 15*XYZ; break;
  };
  p = (p + ROUND)>>N;
  return p;
};
```

Figure 7:
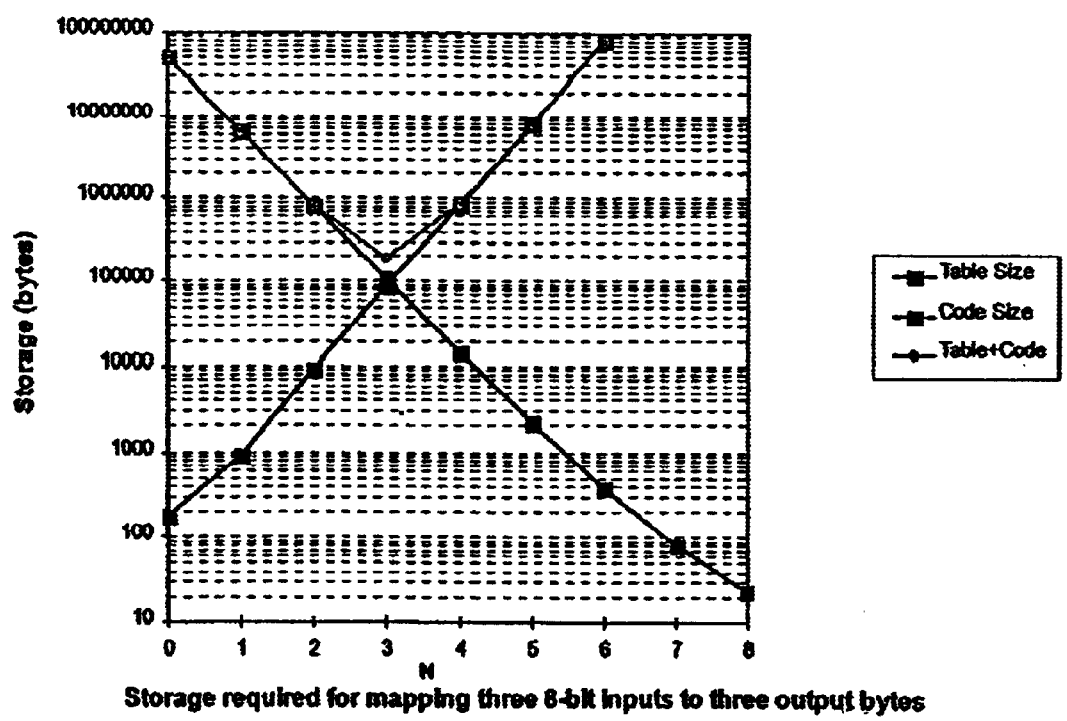
FIG. 7 shows storage required for mapping three 8-bit inputs to three output bytes using an embodiment of the invention.

As N increases, a greater number of case statements are required as the distance between coarse lattice points increases (though the table size itself decreases relatively). The task of, for example, mapping three input bytes to three output bytes (similar to the above example, but requiring three assignment statements per line instead of one assignment statement per line as in the example above) can be achieved for different values of N, but with different effect—in particular, with different overall storage requirements for the code and the table. FIG. 7 shows the storage required for different values of N. The code size is for a program compiled using cc with no flags on a Hewlett-Packard 735 workstation running HP-UX version 9 as reported by the Unix size program (and would differ with different compilers or target instruction sets). The table size will be $3.(2^{8-N}+1)^3$ bytes and the code will have $(2^N)^3$ cases.

As can be seen from FIG. 7, in this case the smallest total storage (200 kBytes) occurs for N=3. Increasing N above 3 has in this case no advantage and several disadvantages: the table will have fewer entries, and so will probably be less precise; the average number of lookups will increase, so the interpolation will be slower; and the large number of switch statements may defeat some compilers. If more storage is available, then reducing N will generally speed up the interpolation and increase precision. Moreover, the relative advantage of techniques according to the invention over other interpolation techniques increases for small N, as even fewer memory accesses are required. This is likely to render this technique particularly useful where memory is cheap, and use of large tables common.

As indicated above, although described for a 3-dimensional lattice, methods in accordance with the invention can be used for n-dimensional spaces (and may in particular be useful for dimensions greater than 3). The general geometric figure providing the basis for interpolation is an n-simplex in an n-dimensional space (a tetrahedron is a 3-simplex, and a triangle is a 2-simplex). In the case of a point P within an n-simplex, where the vertices of the n-simplex are known value lattice points V0, V1, V2 . . . Vn with values v0, v1, v2 . . . vn, and the point is an intermediate lattice point requiring interpolation to find its value p, it can first be considered that (n+1) n-simplexes exist which have n vertices in common with the known value n-simplex and which have P as the other vertex. If the volumes of these (n+1) n-simplexes add up to the volume of the known value n-simplex, P lies within the known value n-simplex (or on its boundary). The value of p can then be found by:

$$p=(v0(\text{volume}(P,V1,V2 \ldots Vn)+v1(\text{volume}(V0,P,V2 \ldots Vn)+v2(\text{volume}(V0,V1,P \ldots Vn) \ldots +vn(\text{volume}(V0,V1,V2 \ldots P))))/\text{volume}(V0,V1,V2,Vn)$$

If any of the n-simplexes which have P as a vertex should have a zero volume, then P must lie in the (n−1)-simplex that does not include P—for example, if volume (V0,P,V2 . . . Vn)=0, then P lies in or on the (n−1)-simplex with vertices V0,V2 . . . Vn. If this is the case, then only n look up operations are required rather than n+1—correspondingly fewer look up operations are required if further ones of these n-simplex volumes are zero.

The same approach to implementing interpolation—use of earlier generated case statements—can be applied in any n-dimensional case. Similarly, it is quite as possible to snap to a vertex, an edge, a plane, or even an (n−1)-simplex in the n-dimensional case as it is in the specific three dimensional case.

What is claimed is:

1. A method of determining a value for a function, comprising:
    establishing an n-dimensional lattice having a plurality of lattice points, the function having values at the lattice points, wherein n is an integer equal to three;
    recording values for a subset of the lattice points, the lattice points of the subset being known value lattice points;
    establishing a value for a given lattice point by returning a weighted average of the values of one or more of four known value lattice points defining an n-simplex touching or enclosing the given lattice point, wherein the n-simplex comprises a tetrahedron; and
    using a weighted average of all four known value lattice point values if the given lattice point is enclosed by the tetrahedron but is not touched by a face of the tetrahedron, using a weighted average of three of the four known value lattice point values if the given lattice point is on a face of the tetrahedron bounded by the three of the four known value lattice points but is not touched by an edge of the tetrahedron, using a weighted average of two of the four known value lattice point values if the given lattice point is on an edge of the tetrahedron bounded by the two of the four known value lattice points but is not at a vertex of the tetrahedron, and using a value of one of the known value lattice points if the given lattice point is also the known value lattice point;
    wherein a given lattice point close to an edge or a face of the tetrahedron is changed to a point lying on the edge or the face of the tetrahedron before calculation of the weighted average.

2. A method of determining a value for a function, comprising:
    establishing an n-dimensional lattice having a plurality of lattice points, the function having values at the lattice points, wherein n is a positive integer greater than or equal to two;
    recording values for a subset of the lattice points, the lattice points of the subset being known value lattice points; and
    establishing a value for a given lattice point by determining the values of only m of (n+1) known value lattice points, defining an n-simplex touching or enclosing the given lattice point, wherein m is a positive integer equal to the number of n-simplexes of non-zero volume whose vertices consist of the given lattice point and n of the (n+1) known value lattice points, and by returning a weighted average of said m of the known value lattice points;
    wherein n=3 and the n-simplex comprises a tetrahedron;
    wherein a weighted average of all four known value lattice point values is used if the given lattice point is enclosed by the tetrahedron but is not touched by a face of the tetrahedron, a weighted average of three of the four known value lattice point values is used if the given lattice point is on a face of the tetrahedron bounded by the three of the four known value lattice points but is not touched by an edge of the tetrahedron, a weighted average of two of the four known value lattice point values is used if the given lattice point is on an edge of the tetrahedron bounded by the two of the four known value lattice points but is not at a vertex of the tetrahedron, and wherein a value of one of the known value lattice points is used if the given lattice point is also the known value lattice point; and
    wherein a given lattice point close to a known value lattice point is changed to the known value lattice point before calculation of the weighted average.

3. The method as claimed in claim 2, wherein the known value lattice points from a sparse lattice with known value lattice points separated from each other by an integer multiple of the distance between adjacent lattice points.

4. The method as claimed in claim 3, wherein said integer multiple is an integer power of two.

5. The method as claimed in claim 4, wherein the integer is 8 or more and all give lattice points coincide with a value lattice point or lie between two adjacent value lattice points or lie within a triangle described by three adjacent value lattice points or lie within or lie within a tetrahedron of four adjacent value lattice points.

6. The method as claimed in claim 5, where the integer is 8.

7. A method of determining a value for a function, comprising:
    establishing an n-dimensional lattice having a plurality of lattice points, the function having values at the lattice points, wherein n is a positive integer greater than or equal to two;
    recording values for a subset of the lattice points, the lattice points of the subset being known value lattice points; and
    establishing a value for a given lattice point by determining the values of only m of (n+1) known value lattice points, defining an n-simplex touching or enclosing the given lattice point, wherein m is a positive integer equal to the number of n-simplexes of non-zero volume whose vertices consist of the given lattice point and n of the (n+1) known value lattice points, and by returning a weighted average of said m of the known value lattice points;
    wherein n=3 and the n-simplex comprises a tetrahedron;
    wherein a weighted average of all four known value lattice point values is used if the given lattice point is enclosed by the tetrahedron but is not touched by a face of the tetrahedron, a weighted average of three of the four known value lattice point values is used if the given lattice point is on a face of the tetrahedron bounded by the three of the four known value lattice points but is not touched by an edge of the tetrahedron, a weighted average of two of the four known value lattice point values is used if the given lattice point is on an edge of the tetrahedron bounded by the two of the four known value lattice points but is not at a vertex of the tetrahedron, and wherein a value of one of the known value lattice points is used if the given lattice point is also the known value lattice point; and wherein a given lattice point close to an edge or a face of the tetrahedron is changed to a point lying on the edge or the face of the tetrahedron before calculation of the weighted average.

8. The method as claimed in claim 7, wherein if the given lattice point is on a face of the tetrahedron bounded by the three of the four known value lattice points but is not touched by an edge of the tetrahedron, the three of the four known value lattice points being A, B and C with values a, b and c respectively, the value p returned is given by p=((Area(BCP). a)+(Area(ACP). b)+(Area(ABP). c)/Area (ABC).

9. The method as claimed in claim 7, wherein if the given lattice point is on an edge of the tetrahedron bounded by the two of the four known value lattice points but is not at a vertex of the tetrahedron, the two of the four known lattice points being A and B with values a and b, the value p returned is given by p=((Distance(AP). b)+(Distance(BP). a))/Distance(AB).

10. The method as claimed in claim 7, wherein the integer is 4 and all given lattice points coincide with a value lattice point or lie between two adjacent value lattice points or lie within a triangle described by three adjacent value lattice points.

* * * * *